United States Patent
Uematsu

(10) Patent No.: US 7,405,952 B2
(45) Date of Patent: Jul. 29, 2008

(54) POWER SUPPLY DEVICE

(75) Inventor: Takeshi Uematsu, Tokyo (JP)

(73) Assignee: TDK Corporation, Tokyo (JP)

( * ) Notice: Subject to any disclaimer, the term of this patent is extended or adjusted under 35 U.S.C. 154(b) by 82 days.

(21) Appl. No.: 11/354,057

(22) Filed: Feb. 15, 2006

(65) Prior Publication Data

US 2006/0187685 A1 Aug. 24, 2006

(30) Foreign Application Priority Data

Feb. 22, 2005 (JP) .............................. 2005-045241

(51) Int. Cl.
*H02M 3/335* (2006.01)
(52) U.S. Cl. .................... 363/21.04; 363/20; 307/46; 307/48
(58) Field of Classification Search ............ 363/20, 363/21.02, 21.04, 21.06, 21.14; 307/44–46, 307/48, 66, 87
See application file for complete search history.

(56) References Cited

U.S. PATENT DOCUMENTS

| | | | | |
|---|---|---|---|---|
| 5,862,043 A | * | 1/1999 | Youn et al. ............... | 363/21.04 |
| 6,166,924 A | * | 12/2000 | Assow ...................... | 363/20 |
| 6,519,164 B1 | * | 2/2003 | Weng et al. .............. | 363/21.04 |
| 6,788,557 B2 | * | 9/2004 | Phadke .................... | 363/21.16 |
| 6,954,366 B2 | * | 10/2005 | Lai et al. ................. | 363/71 |
| 7,038,922 B2 | * | 5/2006 | Diallo et al. ............ | 363/21.06 |

FOREIGN PATENT DOCUMENTS

| | | |
|---|---|---|
| JP | A 63-290166 | 11/1988 |
| JP | A-05-260750 | 10/1993 |
| JP | A 08-033341 | 2/1996 |
| JP | A-08-298769 | 11/1996 |
| JP | A 2002-125367 | 4/2002 |

\* cited by examiner

*Primary Examiner*—Jeffrey L. Sterrett
*Assistant Examiner*—Stuart Hansen
(74) *Attorney, Agent, or Firm*—Oliff & Berridge, PLC

(57) ABSTRACT

A power supply device has first and second terminals, a transformer, a switching element and an auxiliary power supply element. The first and second terminals receive input power having an input voltage. The transformer has a primary winding and a secondary winding. The primary winding has a pair of winding terminals. One of the pair of winding terminals is connected to the first terminal. The switching element is connected between the second terminal and the other of the pair of winding terminals of the primary winding. The auxiliary power supply element feeds electric power to the transformer when the input voltage decreases to or less than a predetermined value. The auxiliary power supply element has a capacitor and a second switching element for storing energy from the primary winding into the first capacitor during a normal operation of the power supply device.

3 Claims, 2 Drawing Sheets

POWER SUPPLY DEVICE

BACKGROUND OF THE INVENTION

1. Technical Field

This invention relates to a power supply device. The present invention relates to a power supply device used for a back light of a liquid crystal display device, and an electronic device such as a personal computer. Particularly, the present invention relates to an uninterruptible power supply (UPS) which supplies power when an input voltage from a power supply accidentally drops below a predetermined value.

2. Related Art

A power supply circuit used for an electronic device is required to maintain feeding electric power for a predetermined time period after an electric failure such as an abrupt voltage drop and/or an instantaneous interruption occurs. If the electronic device is fed at least for the predetermined time period after the above electric failure, malfunction and/or breakdown of the electronic device caused due to the above electric failure can be prevented. Hence, installation of an auxiliary power supply is indispensable for protecting the electric device from the electric failure.

For example, Japanese Patent Application Publication HEI 08-298769 (JP 08-298769) discloses a switching power supply having an auxiliary power supply. The power supply device is proposed in which a secondary winding is added to a reactor constituting an active filter in a step-up chopper, and a higher frequency AC voltage is taken out from the secondary winding as an input of the auxiliary power supply. The switching power supply includes the auxiliary power supply so that activation and suspension of the power supply can be controllable from an external device.

However, the power supply device does not have any mechanism for ensuring the sufficient holding time to maintain the feed of the electric power by the power supply device. As a result, a problem may arise that the feed from the power supply device is stopped.

On the other hand, an insulation type of power supply device is disclosed for insulating an input side from an output side through a transformer provided therebetween. This power supply device includes a capacitor on a secondary side of the transformer for storing electric energy and ensuring feed of electric power to a load for a certain time period after an instantaneous interruption, i.e., a holding time period.

However, the insulation type of power supply device has the following possible disadvantages. Generally, the secondary side of the transformer in the power supply device has a lower voltage than a voltage of the primary side. Energy stored in the capacitor is expressed by $CV^2/2$ (C is a capacitance of the capacitor, and V is a voltage across the capacitor), and is proportional to the square of the voltage across the capacitor. Since the voltage of the secondary side is generally low, a larger capacitance of the capacitor is required to ensure the desired holding time period. This structure results in upsizing of the power supply device.

An object of the present invention is to provide a power supply device which ensure sufficient feed of electric power to an electric and/or electronics device connected thereto for a certain time period after an input voltage to the power supply device falls to or less than a predetermined value.

SUMMARY

The present invention provides a power supply device having: first and second terminals, a transformer, a switching element, and auxiliary power supply means. The first and second terminals receive input power having an input voltage. The transformer has a primary winding and a secondary winding. The primary winding has a pair of winding terminals. One of the pair of winding terminals is connected to the first terminal. The switching element is connected between the second terminal and the other of the pair of winding terminals. The auxiliary power supply means feeds electric power to the transformer when the input voltage decreases to or less than a predetermined value. The auxiliary power supply means has a capacitor and a second switching mean for storing energy from the primary winding into the first capacitor during a normal operation of the power supply device. When the input voltage decreases to or less than the predetermined value, the auxiliary power supply means provides a current path between the first and second terminals to supply the energy stored in the capacitor to the transformer, thereby continuing feed of the electric power to the secondary winding.

The present invention further provides a power supply device having: direct current (DC) generating means, a first switching element, a transformer, auxiliary power supply means, detecting means, and a controller. The DC generating means generates a direct current. The DC generating means has two output terminals. The transformer has a primary winding and a secondary winding. The primary winding is connected in series to the first switching element. The series-connected first switching element and primary winding is connected to the two output terminals of the DC generating means. The auxiliary power supply means stores power and feeds power to the primary winding. The auxiliary power supply means has a second switching element, and a capacitor connected in series with the second switching element. The series-connected second switching element and capacitor is connected in parallel to the first switching element. The detecting means detects an effective voltage value of the direct current. The controller switches the first and second switching elements complementarily to transfer power from the primary winding to the secondary winding and charge the capacitor. The controller provides a current path to circle a current flow flowing the primary winding when the effective voltage value decreases to or less than a predetermined value, thereby continuing energizing the transformer.

The present invention provides a power supply device having: a pair of input ports, pair of output ports, a transformer, switching means, and a controller. The pair of input ports receives input power having an input voltage. The transformer has a primary winding and a secondary winding, the secondary winding being connected to the pair of output ports. The switching means is connected in series with the primary winding, the series-connected switching means and primary winding being connected to the pair of input ports. The switching means has a first switching element and a first capacitor. The controller controls the first switching element to feed the input power to the transformer and charge the first capacitor. The controller provides a closed current path to feed electrical energy stored in the first capacitor to the primary winding when the input voltage decreases to or less than a predetermined value, thereby continuing feed of electric power to the transformer.

BRIEF DESCRIPTION OF THE DRAWINGS

The aforementioned aspects and other features of the invention are explained in the following description, taken in connection with the accompanying drawing figures wherein.

DESCRIPTION OF THE EMBODIMENT

An embodiment of the present invention will be described with reference to the accompanying drawings.

Figure 1:
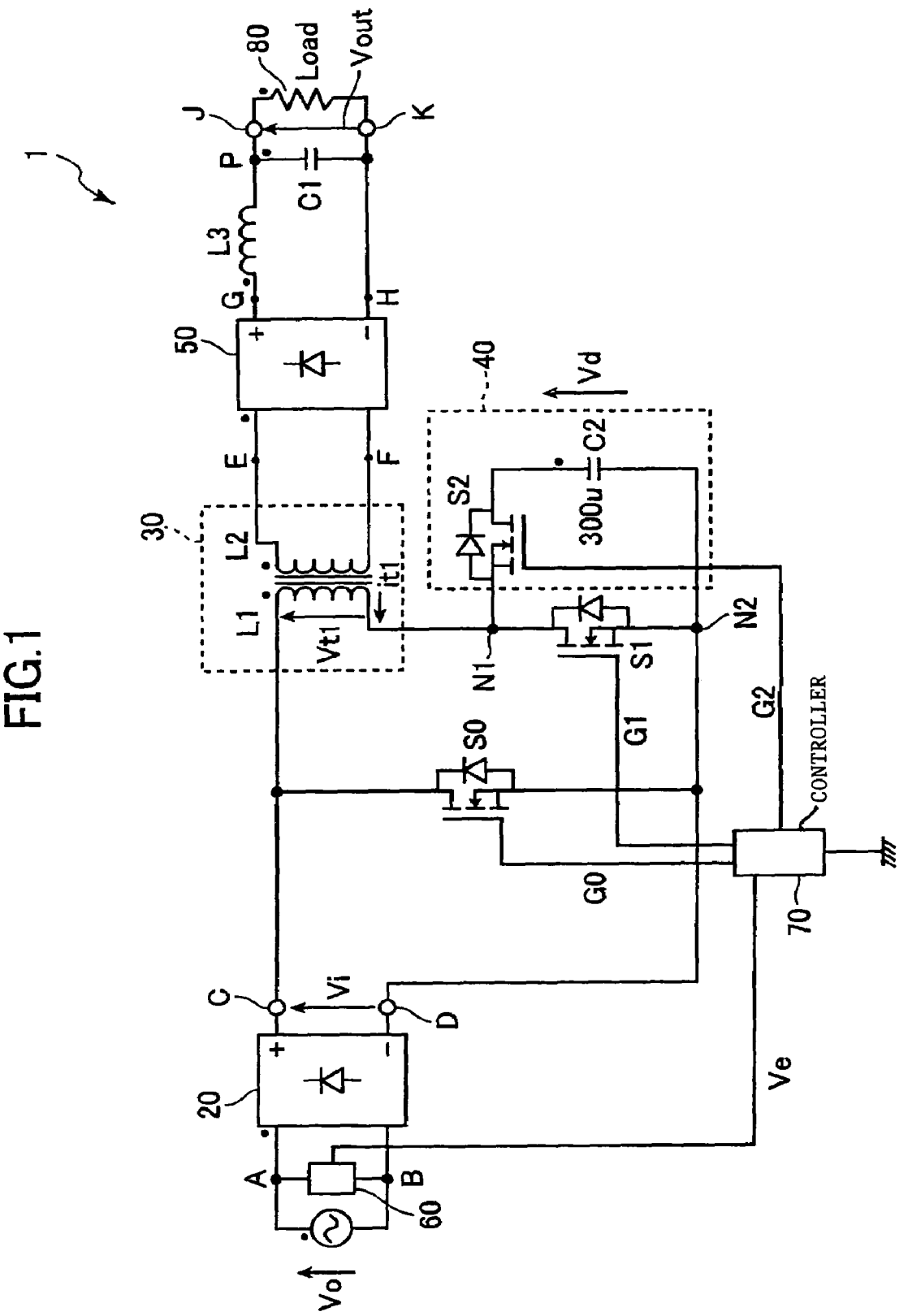
FIG. 1 is a circuit diagram showing a power supply device according to the present invention.

FIG. 1 shows a power supply device 1 of an embodiment according to the present invention. The power supply device 1 includes an input-side rectifier 20, a transformer 30, a first switching element S1, an auxiliary power supply unit 40, an output-side rectifier 50, a voltage detector 60, a auxiliary switching element S0, and a controller 70.

The input-side rectifier 20 is a full-wave rectifier including a diode bridge. The rectifier 20 rectifies an AC voltage $V_0$ supplied from an AC power supply 10 through input terminals A, B to generate a direct current voltage Vi, which appears between output terminals C, D. The AC power supply 10 is a commercial power supply to feed the AC voltage $V_0$.

The transformer 30 has a primary winding L1 and a secondary winding L2 having a turns ratio of n:1. The primary and secondary windings L1, L2 are arranged to exhibit homopolarity to each other. The primary winding L1 has a pair of winding terminals. The primary winding L1 is connected in series with the first switching element S1 through one of the winding terminals and a node N1. The primary winding L1 is connected to the terminal C through the other of the winding terminals. The secondary winding L2 is connected to input terminals E, F of the output-side rectifier 50.

The first switching element S1 is made from a field-effect transistor (FET). The first switching element S1 has one end connected to the primary winding L1 at the node N1 and the other end connected to the terminal D at a node N2. A switching operation of the first switching element S1 is controlled by a switching signal G1 from the controller 70.

The output-side rectifier 50 is a full-wave rectifier including a diode bridge. The rectifier 50 rectifies the output AC voltage of the transformer 30 to a direct current voltage, which appears between output terminals G, H.

An inductor L3 and a capacitor C1 are connected in series between the terminals G, H. A voltage across the capacitor C1 becomes an output voltage $V_{out}$ of the power supply device 1. In other words, A connecting point P of the inductor L3 and the capacitor C1 is provided as an output terminal J of the power supply device 1. The other end of the capacitor C1 which is opposite to the connecting point is provided as the other output terminal K of the power supply device 1. Any electronics device including a liquid crystal display may be electrically connected to the output terminals J, K as a load 80.

The auxiliary switching element S0 is connected between the terminals C, D. In other words, the auxiliary switching element S0 is connected in parallel with the series-connected primary winding L1 and the first switching element S1. The auxiliary switching element S0 is made from an FET. The switching operation of the auxiliary switching element S0 is controlled by a switching signal G0 from the controller 70. Generally, the auxiliary switching element S0 is open or OFF during a normal operation of the power supply device 1.

The auxiliary power supply circuit 40 is connected in parallel with the first switching element S1 between the nodes N1, N2. The auxiliary power supply unit 40 includes a second switching element S2 and a capacitor C2 connected in series with each other. The second switching element S2 is made from an FET. A switching operation of the second switching element S2 is controlled by a switching signal G2 from the controller 70. The capacitor C2 has a capacitance of 300 µF. In another embodiment, the capacitor C2 has any appropriate capacitance, depending on an application of the power supply device 1.

The voltage detector 60 is connected between the terminals A, B to detect an effective value of an output voltage $V_0$ from the AC power supply 10. The voltage detector 60 send an output signal indicating the detected effective value $V_e$ of the output voltage $V_0$ to the controller 70.

The controller 70 generates the switching signals G0, G2, and G3 to send the switching signals G0, G1, and G2 for the switching operation of the switching elements S0, S1, and S2, respectively. The controller 70 switches the first switching element S1 and the second switching element S2 complementarily not to turn on both of the first and second switching elements S1, S2 simultaneously. The controller 70 sets up a switching frequency of the first and second switching elements S1, S2 to be more than a frequency of the AC voltage $V_0$. Additionally, the controller 70 receives the output signal from the voltage detector 60 and determines based on the received output signal whether an AC power failure occurs. In the present invention, the AC power failure means a temporary voltage drop, temporary blackout, instantaneous interruption, and shut off and shut down of electric power.

As described above, the power supply device 1 is constituted.

Subsequently, the operation of the power supply apparatus 1 will be described. In the following description, the direct current voltage Vi is defined in order that the terminal C is at a higher potential than the terminal D. A voltage $V_{t1}$ across the primary winding L1 is defined in order that the other of the winding terminals is at a higher potential than the one of the winding terminals. A voltage $V_d$ across the capacitor C2 is defined in order that one end connected to the second switching element S2 is at a higher potential than the other end. The output voltage $V_{out}$ is defined in order that the terminal J is at a higher potential than the terminal K.

First, a normal operation of the power supply device 1 will be described. During the normal operation, the controller 70 maintains the auxiliary switching element S0 opens by the switching signal G2. the AC voltage $V_0$ is constantly applied from the AC power supply 10 to the input-side rectifier 20. The input-side rectifier 20 rectifies the input AC voltage. The full-wave rectified voltage $V_i$ appears between the output terminals C and D.

Simultaneously, the voltage detector 60 detects an effective voltage value $V_e$ of the AC voltage $V_0$ at predetermined intervals, and sends the detected effective voltage value $V_e$ to the control circuit 70.

The control circuit 70 determines whether the effective voltage value $V_e$ is more than or equal to a predetermined value. When the effective voltage value $V_e$ is more than or equal to the predetermined value, the controller 70 determines that the power supply device 1 is under a normal operating condition. In the present invention, the normal operating condition means that the power supply device 1 is fed by the AC power supply 10 in a normal manner to generate the output voltage $V_{out}$ which is sufficient for the load 80. On the other hand, the control circuit 70 determines that an AC power failure such as instantaneous interruption of the AC voltage $V_0$, temporary blackout, and abrupt voltage drop occurs, when the effective voltage $V_e$ falls below the predetermined value. The predetermined value corresponds to an effective voltage value by which the output voltage $V_{out}$ applied across the load 80 can be maintained more than or equal to a predetermined value for a predetermined holding time-period after the AC power failure occurs.

When the control circuit 70 determines that the power supply device 1 is under the normal operation condition, the control circuit 70 maintains the auxiliary switching element S0 open.

Figure 2A:
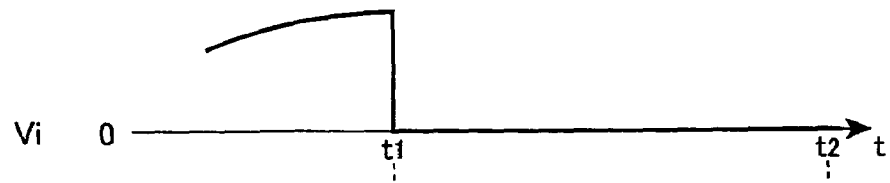
FIGS. 2A-2G are waveform charts showing an input voltage $V_i$, ON/OFF of switching elements S0, S1, and S2, voltage $V_{t1}$ and current flow $i_{t1}$ of the primary winding L1, and output voltage $V_{out}$ of the power supply device, respectively.
Figure 2B:
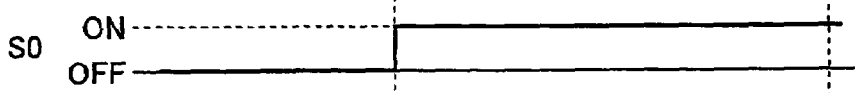
Figure 2C:
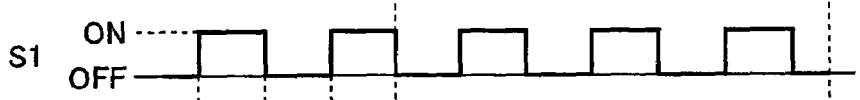
Figure 2D:

The controller 70 switches the first switching element S1 and the second switching element S2 complementarily, as shown in FIGS. 2C and 2D in order not to close the first and second switching elements S1, S2 simultaneously. At this time, the first switching element S1 intermittently connects the one winding terminal of the primary winding L1 to the output terminal D to form a current path in which a direct current flows from the terminal C to the terminal D through the primary winding L1 and the first switching element S1 in turn. The second switching element S2 intermittently connects the one winding terminal of the primary winding L1 to the capacitor C2. While the switch S2 is closed, the electrical energy is stored in the capacitor C2. In other words, the capacitor C2 is charged.

Further, the controller 70 is able to adjust a duty of the switching operation in which each switching element S1, S2 is closed. Accordingly, the amount of current flow flowing through the primary winding L1 can be adjusted, so that the voltage induced across the secondary winding L2 is changed. In another embodiment, the switching frequency of the switching operations is not required to be fixed. In other words, the switching frequency of the switching operation can be changed during the operation of the power supply device 1.

Figure 2E:
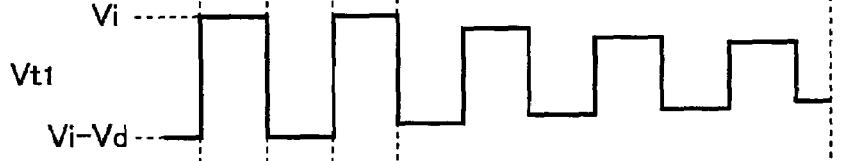
Figure 2F:
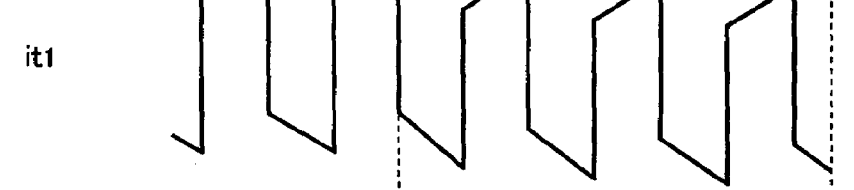

During the normal operation of the power supply device 1, when the first switching element S1 is closed and the second switching element S2 is open, the voltage $V_{t1}$ becomes equal to the voltage $V_i$, as shown in FIGS. 2C, 2D, and 2E. When the first switching element S1 is open and the second switching element S2 is closed, the voltage $V_{t1}$ becomes equal to $V_i-V_d$. The voltage $V_{t1}$ which changes in the above described manner causes a current flow $i_{t1}$ flowing through the primary winding L1, as shown in FIG. 2F. The current flow $i_{t1}$ has a deformed rectangular wave forms, as time elapses.

Figure 2G:
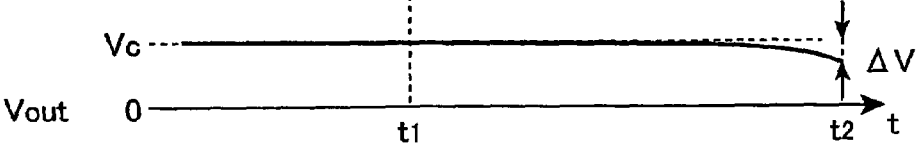

On the output side of the transformer 30, a voltage corresponding to an electromotive force is induced depending on the turns ratio and a change in the current flow $i_{t1}$, and the induced voltage appears across the secondary winding L2. The induced voltage is rectified by the output-side rectifier 50. The output voltage of the output-side rectifier 50 is smoothed by the inductor L3 and the capacitor C1. The smoothed voltage appears as the output voltage $V_{out}$ between the output terminals J and K. During the normal operation, the output voltage $V_{out}$ becomes a substantially constant DC voltage $V_c$, as shown in FIG. 2G. At this time, the output side of the power supply device 1 is electrically insulated from the input side of the power supply device 1.

Referring to FIG. 2A, when an instantaneous interruption occurs at a time $t_1$, the controller 70 determines based on the detected effective voltage value $V_e$ that the AC power failure occurs. The control circuit 70 immediately sends the switching signal G0 to close the auxiliary switching element S0, thereby providing a current path between the terminals C and D. In other words, the closed circuit is provided including the series-connected primary winding L1 and the first switching element S1, and the auxiliary switching element S0.

Simultaneously, the controller 70 continues the complementary switching operation of the first and second switching elements S1 and S2, similarly to the normal operating condition. Accordingly, when the first switching element S1 is open and the second switching element S2 is close, a closed circuit is formed to include the capacitor C2, the second switching element S2, the primary winding L1, and the auxiliary switching element S0 sequentially. At this time, the electrical energy stored in the capacitor C1 is discharged to flow through the primary winding L1 as a current flow, thereby circling the closed circuit. In other words, the primary winding L1 is energized by the capacitor C2 to transfer electric power from the primary winding L1 to the secondary winding L2.

On the other hand, when the first switching element S1 is closed and the second switching element S2 is open, another closed circuit is formed to include the first switching element S1 and the primary winding L1.

As described above, when the second switching element S2 is closed, the a closed circuit including the capacitor C2, the second switching element S2, the primary winding L1 and the auxiliary switching element S0 is formed. Therefore, the primary winding L1 is energized. Accordingly, as shown in FIG. 2E, the voltage $V_{t1}$ does not disappear immediately, but maintains appearing similarly to the voltage $V_{t1}$ prior to the AC power failure. However, considering the electric loss of wiring, the magnitude of the voltage $V_{t1}$ gradually decreases, exhibiting a rectangular wave form. Accompanied with the change in the voltage $V_{t1}$, the magnitude of the current $i_{t1}$ gradually decreases, as shown in FIG. 2F.

Even after the AC power failure has occurred, the primary winding L1 is maintained energized. Therefore, an electromotive force is induced across the secondary winding L2 based on the winding ratio and a change in the current $i_{t1}$. The voltage corresponding to the induced electromotive force is rectified by the rectifier 50. The rectified voltage is then smoothed by the inductor L3 and the capacitor C1. The smoothed voltage appears between the output terminals J, K as the output voltage $V_{out}$.

After the AC power failure, the $V_{out}$ gradually decreases from the $V_c$, as the time elapses. At a time $t_2$, the voltage $V_{out}$ becomes $V_c-\Delta V$. If the voltage $V_c-\Delta V$ is the minimum drive voltage which is required by the electronic device connected between the output terminals J and K, a time period: $t=t_2-t_1$ is considered a holding time-period after the AC power failure.

When a voltage of 400V is applied across the capacitor C2 by using the AC power supply 10 of 50 Hz as an example, the capacitor C2 is required to have a capacitance of 300 µF for ensuring the holding time of 30 ms, i.e., one and a half cycle.

As described above, in the power supply device 1 of this embodiment, when the controller 70 determines based on the output signal the voltage detector 60 that an AC power failure occurs, the controller 70 closes the auxiliary switching element S0 to provide the current path for discharging the electrical energy stored in the capacitor C2 to the primary winding L1. Accordingly, an electromotive force can be continuously induced across the secondary winding L2 even after the AC power failure occurs. Therefore, the application of the output voltage $V_{out}$ across the load can be continuously maintained. If the capacitance of the capacitor C1 is changed, the duration of the holding time period after the AC power failure can be adjusted. Thus, the desired holding time period required by the load can be ensured. Accordingly, malfunction and/or breakdown of the electronic device fed by the power supply device 1 after the AC power failure can be prevented.

In this embodiment, the capacitor C2 for storing electrical energy and supplying the electric power to the primary winding L1 after an electric failure is provided on the primary side of the transformer 40. Generally, an output voltage $V_{out}$ is set at approximately 40 volts in many cases. However, the primary side of the power supply device 1 is configured as a step-up circuit, so that a higher voltage than the secondary side such as 400 volt is applied across the capacitor C2. Since a voltage on the primary side is generally higher than a voltage on the secondary side, a capacitor C2 having a smaller capacitance can be used on the primary side for storing the same amount of electrical energy, compared with a capacitor provided on the secondary side. In other words, in order to store the same amount of electrical energy and ensure the same length of the holding time period, a capacitor having a smaller capacitance can be used. Accordingly, the size of the power supply device 1 can be minimized and the total number of components can be reduced so that a cost to manufacture the power supply device 1 can be reduced.

In this embodiment, the first and second switching elements S1 and S2 are switched in an complementary manner to switch the closed circuits on the primary side. In other words, when the first switching element S1 is closed and the second switching element S2 is open, the closed circuit includes the primary winding L1 and the first switching element S1, so that a current flow flows from the terminal C through the primary winding L1 and the first switching element S1 to the terminal D. On the other hand, when the first switching element S1 is open and the second switching element S2 is closed, the closed circuit includes the primary winding L1, the second switching element S2, and the capacitor C2, so that a current flow flows from the terminal C, the primary winding L1, and the second switching element S2, and the capacitor C2 to the terminal D. As a result, the power supply device 1 can improve a power factor thereof.

It is understood that the foregoing description and accompanying drawings set forth the preferred embodiments of the invention at the present time. Various modifications, additions and alternative designs will, of course, become apparent to those skilled in the art in light of the foregoing teachings without departing from the spirit and scope of the disclosed invention. Thus, it should be appreciated that the invention is not limited to the disclosed embodiments but may be practiced within the full scope of the appended claims.

In another embodiment, the configuration of the auxiliary power supply circuit is not limited to the above described auxiliary power supply circuit 40. Any circuit having similar operation can be used as the auxiliary power supply circuit 40.

The auxiliary switching element S0 may be replaced with an appropriate element such as a capacitor and an inductor, if the appropriate element has a similar operation. In another embodiment, if the auxiliary switching element S0 is replaced with a capacitor, this capacitor may have a capacitance which is less than one-tenth of the capacitance of the capacitor C2. With this configuration, the controller 70 does not have to generate any control signal for the auxiliary switching element S0. Since a capacitor is not so expensive as a FET which can constitute the auxiliary switching element S0, cost of the power supply device 1 can be reduced.

In another embodiment, the voltage detector 60 may detect an effective value of a voltage between the output terminals C and D.

Circuit configurations in the power supply device 1 are not limited to the above. When the similar operation can be performed, the other element may be used.

What is claimed is:

1. A power supply device comprising:
   a direct current (DC) generating unit for generating a direct current, the DC generating unit having a pair of output terminals;
   a first switching element;
   a transformer having a primary winding and a secondary winding, the primary winding being connected in series to the first switching element, the series-connected first switching element and primary winding being connected to the pair of output terminals of the DC generating unit;
   an auxiliary power supply unit for storing power and feeding power to the primary winding, the auxiliary power supply unit comprising a second switching element, and a capacitor connected in series with the second switching element, the series-connected second switching element and capacitor being connected in parallel to the first switching element;
   a detecting unit for detecting an effective voltage value of the direct current;
   a third switching element connected between the pair of output terminals; and
   a controller for switching the first and second switching elements complementarily to transfer power from the primary winding to the secondary winding and charge the capacitor, wherein
   the controller sends a first control signal to maintain the third switching element open when the effective voltage value is more than a predetermined value, and the controller sends a second control signal to close the third switching element to provide a current path for a current to flow through the primary winding when the effective voltage value decreases to or less than the predetermined value, thereby continuing energizing the transformer.

2. The power supply device according to claim 1, wherein the DC generating unit comprises a rectifier for rectifying an alternating current power.

3. A power supply device comprising:
   a pair of input ports for receiving input power having an input voltage,
   a pair of output ports for delivering output power,
   a transformer having a primary winding and a secondary winding, the secondary winding being connected to the pair of output ports;
   switching means connected in series with the primary winding, the series-connected switching means and primary winding being connected to the pair of input ports, the switching means comprising a first switching element, a second switching element, and a capacitor, the second switching element being connected in series with the capacitor, the series-connected second switching element and capacitor being connected in parallel with the first switching element;
   a controller for controlling the switching means to feed the input power to the transformer and charge the capacitor; and
   a third switching element connected in parallel with the series-connected switching means and primary winding, wherein
   the controller sends first control signals to complementarily close the first and second switching elements to charge the capacitor when the second switching element is closed, and
   the controller sends a second control signal to close the third switching element to provide a current path to feed electrical energy stored in the capacitor to the primary winding when the input voltage decreases to or less than a predetermined value to continue feed of electric power to the transformer, otherwise, the controller sends a third control signal to maintain the third switching element open.

* * * * *